US008632433B2

(12) United States Patent
Shimizu et al.

(10) Patent No.: US 8,632,433 B2
(45) Date of Patent: Jan. 21, 2014

(54) HYDRAULIC CONTROL SYSTEM FOR AUTOMATIC TRANSMISSION AND CONTROL SYSTEM FOR AUTOMATIC TRANSMISSION

(75) Inventors: Tetsuya Shimizu, Anjo (JP); Kenichi Tsuchida, Kazu-gun (JP); Yoshimitsu Hyodo, Nishio (JP); Kazunori Ishikawa, Toyota (JP)

(73) Assignee: Aisin AW Co., Ltd., Aichi-Ken (JP)

( * ) Notice: Subject to any disclaimer, the term of this patent is extended or adjusted under 35 U.S.C. 154(b) by 420 days.

(21) Appl. No.: 13/033,066

(22) Filed: Feb. 23, 2011

(65) Prior Publication Data

US 2011/0239803 A1    Oct. 6, 2011

(30) Foreign Application Priority Data

Mar. 31, 2010    (JP) .................................. 2010-082530

(51) Int. Cl.
*F16H 61/16*    (2006.01)
(52) U.S. Cl.
USPC .......................................................... 475/119
(58) Field of Classification Search
USPC .......................................... 477/126; 475/119
See application file for complete search history.

(56) References Cited

U.S. PATENT DOCUMENTS 4,987,798 A * 1/1991 Funahashi et al. ............. 477/126
5,086,672 A * 2/1992 Kato et al. ........................ 477/41

FOREIGN PATENT DOCUMENTS

JP    2001-004018 A    1/2001
JP    2009-180339 A    8/2009

* cited by examiner

*Primary Examiner* — Sherry Estremsky
(74) *Attorney, Agent, or Firm* — Sughrue Mion, PLLC

(57) ABSTRACT

Provided is an automatic transmission hydraulic control system with a first friction engagement element engaged at a first forward gear and establishment of a reverse gear, and a second friction engagement element to be engaged at least at establishment of a second forward gear different from the first forward gear. Also included is a range pressure output unit outputting a reverse range pressure, a first switching valve having a reverse range pressure input port receiving reverse range pressure, a control pressure input port receiving a control pressure from a linear solenoid valve, and first, second and third output ports. The system also includes a second switching valve having a first input port connected to the first output port, a second input port connected to the second output port, and a fourth output port connected to a hydraulic servo of the first friction engagement element.

4 Claims, 6 Drawing Sheets

FIG.2

|  | C-1 | C-2 | C-3 | C-4 | B-1 | B-2 | F-1 |
|---|---|---|---|---|---|---|---|
| 1ST | ○ |  |  |  |  | (○) | ○ |
| 2ND | ○ |  |  |  | ○ |  |  |
| 3RD | ○ |  | ○ |  |  |  |  |
| 4TH | ○ |  |  | ○ |  |  |  |
| 5TH | ○ | ○ |  |  |  |  |  |
| 6TH |  | ○ |  | ○ |  |  |  |
| 7TH |  | ○ | ○ |  |  |  |  |
| 8TH |  | ○ |  |  | ○ |  |  |
| REV |  |  | ○ |  |  | ○ |  |

※ (○) AT ENGINE BRAKE

HYDRAULIC CONTROL SYSTEM FOR AUTOMATIC TRANSMISSION AND CONTROL SYSTEM FOR AUTOMATIC TRANSMISSION

BACKGROUND OF THE INVENTION

1. Field of the Invention

The present invention relates to an automatic transmission mounted on a vehicle of a passenger car, for example, and specifically, to a hydraulic control system and a control system therefor.

2. Description of the Related Art

Generally, an automatic transmission having a reverse inhibit function not to establish a reverse gear even when a shift lever is operated to a reverse range while a vehicle travels forward at a predetermined or higher speed is widely known. However, in the automatic transmission having the reverse inhibit function, particular valves of a hydraulic control system are controlled not to establish the reverse gear, and accordingly, for example, when the valves lock up in the reverse inhibit state for any reason, the reverse gear may not be established.

On this account, in related art, an automatic transmission adapted to achieve a reverse gear even in the case where particular valves lock up in the reverse inhibit state has been devised (see JP-A-2009-180339).

The automatic transmission in JP-A-2001-4018 includes a reverse sequence valve 4400 that engages and stops a B2 brake 3620 and a B3 brake 3600 to establish a reverse gear and selectively supplies a reverse range pressure and a control pressure of a linear solenoid valve SL4 to the B3 brake 3600 as an engagement pressure, and a B2 control valve 4500 that switches a hydraulic pressure supplied to the B2 brake 3620. Further, by connecting an output port 4406 of the reverse sequence valve 4400 that may communicate with a drain port EX and an input port 4505 of the B2 control valve 4500, the engagement pressure of the B3 brake 3630 is drained from a drain port of the linear solenoid valve SL4 at reverse inhibit and the engagement pressure of the B2 brake 3620 is drained from a drain port EX of the reverse sequence valve 4400 via the input port 4505 and the output port 4406 (see FIG. 7 of JP-A-2001-4018).

Further, the reverse range pressure is input to two input ports 4401, 4403 of a reverse sequence valve 4400 that may communicate with the hydraulic servo of the B3 brake or the output port 4406, and thus, as shown in FIGS. 8 and 9 of the JP-A-2001-4018, even in the case where either the B2 control valve 4500 or the reverse sequence valve 4400 lock up in the reverse inhibit position, the reverse range pressure or the control pressure of the linear solenoid valve SL4 may be supplied to the B2 and B3 brakes 3620, 3630 as the engagement pressure, and the reverse gear may be established.

SUMMARY OF THE INVENTION

The above described B2 brake 360 is a friction engagement element engaged to be stopped not only when the reverse gear is established but also at the first gear of the engine brake. In order not to cause gear shift shock, it is necessary to adjust its engagement pressure for controlling the engagement to stop it.

Accordingly, in the automatic transmission of JP-A-2001-4018, the B2 control valve 4500 is pressure-controlled by a linear solenoid valve 4602 for adjustable supply of the hydraulic pressure to the B2 brake 3620, however, when a switching valve like the B2 control valve 4500 is pressure-controlled by a linear solenoid valve, there is a problem that the cost becomes higher compared to simple switching using an on/off solenoid.

Accordingly, a purpose of the invention is to provide a hydraulic control system and a control system of an automatic transmission including a configuration of switching a switching valve having a reverse inhibit function using an on/off solenoid valve, in which a reverse gear may be established even when the valve locks up in a reverse inhibit state and engagement (engagement to stop) at establishment of a predetermined forward gear of a friction engagement element that engages when the reverse gear and the forward gear are established may be adjusted.

According to a first aspect of the invention, in a first switching valve, plural reverse range pressure input ports to which the reverse range pressure is input and a control pressure input port to which a control pressure from a linear solenoid valve is input are provided, and, in the case of a first state, the reverse range pressure input port is communicated with a second output port and, in the case of a second state, the reverse range pressure input port is communicated with a first output port and the control pressure input port is communicated with the second output port. Even in the case where it may be impossible to switch the first switching valve from the first state or the second state, at least one of the reverse range pressure or the control pressure may reliably be supplied to a second switching valve. Further, the first output port that may output the reverse range pressure and the second output port communicated with the control pressure input port or the reverse range pressure input port are connected to the input port of the second switching valve, and a first friction engagement element may reliably be engaged. Thereby, even in the case where a fail is caused in one of the linear solenoid valve, the first switching valve, and the second switching valve, a reverse gear may be achieved. Furthermore, the first friction engagement element may be pressure-regulation controlled by the linear solenoid valve, and thus, the second switching valve may be switched by a second on/off solenoid valve and a pressure-regulation control of the first friction engagement element may be performed independent from the other controls of a lock-up clutch etc., for example.

According to a second aspect of the invention, the second on/off solenoid valve that may output a signal pressure for switching the second switching valve is a solenoid valve of normally-closed type and the second switching valve is switched to a reverse inhibit side when the second on/off solenoid valve outputs the signal pressure, and thus, a power consumption may be suppressed. Further, the second switching valve is adapted to be switched by the reverse range pressure from the first switching valve, and thus, when the second switching valve is switched in conjunction with the first switching valve, it is not necessary to use the second on/off solenoid valve, the power consumption may be suppressed, and a fuel consumption may be improved.

According to a third aspect of the invention, a second reverse range pressure output port to which the reverse range pressure is output is provided separately from the reverse range port in the first switching valve and the second reverse range pressure output pressure input port or the control pressure input port is selectively communicated with a third output port connected to a hydraulic servo of the second friction engagement element, and thus, even in the case where the control pressure is not output from the linear solenoid valve or the case where it may be impossible to switch the first switching valve from the first state or the second state, the second friction engagement element establishing the reverse gear with the first friction engagement element may be engaged.

According to a fourth aspect of the invention, when a detection of the state in which the reverse gear is not successfully established is made, an instruction is given to a first on/off switching valve to turn the first switching valve into the second state, and thus, even in the case where one of the first switching valve and the second switching valve does not work, the reverse gear may reliably be formed.

BRIEF DESCRIPTION OF THE DRAWINGS

FIG. 2 is an engagement table of the automatic transmission in FIG. 1;

DETAILED DESCRIPTION OF THE EMBODIMENTS

Figure 1:
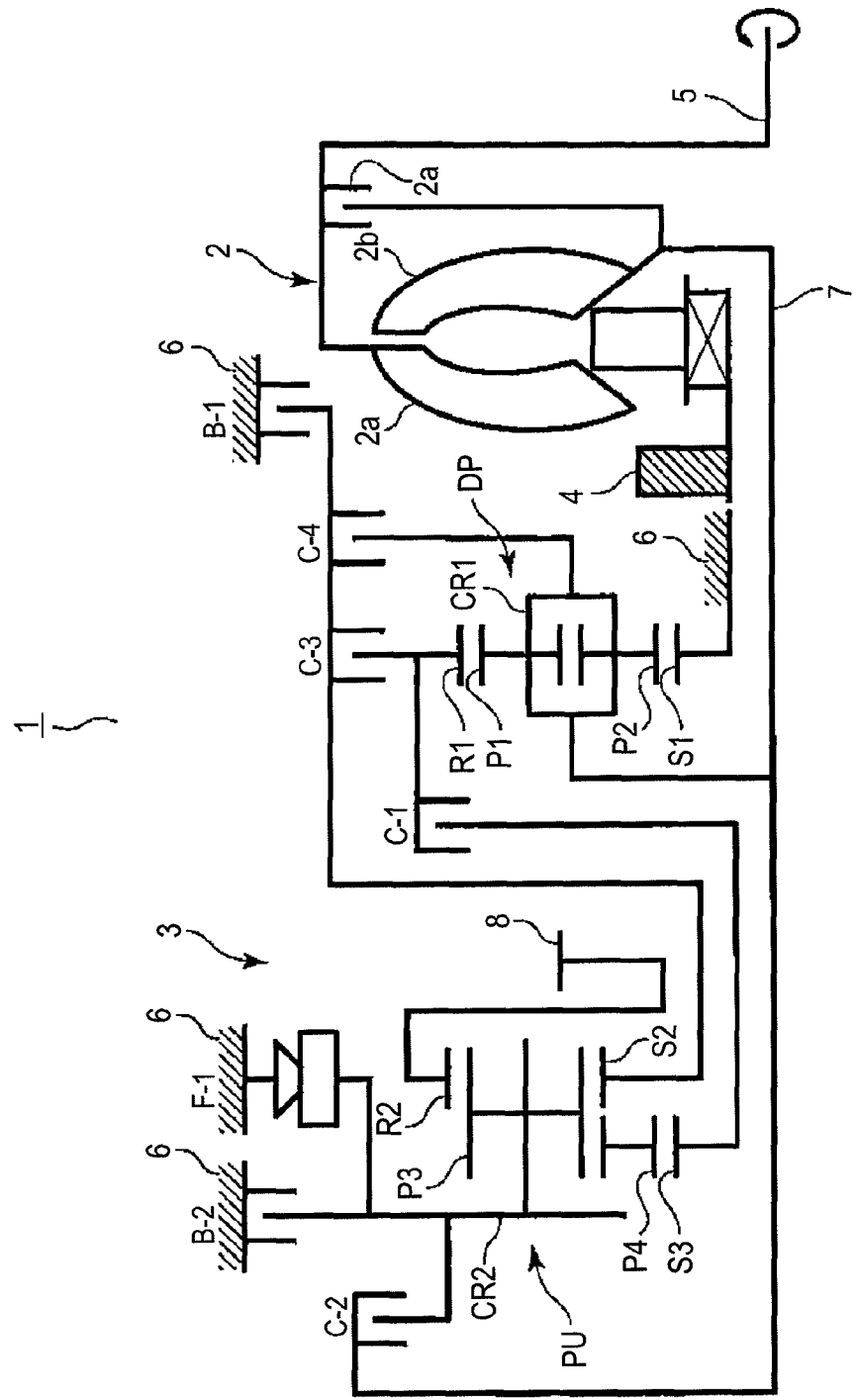
FIG. 1 is a skeleton diagram of an automatic transmission according to a first embodiment of the invention.

As below, embodiments of the invention will be explained with reference to the drawings. Note that the automatic transmission according to the invention is an automatic transmission preferably mounted on a vehicle of FF (front engine/front drive) type or the like, and the horizontal directions in FIG. 1 correspond to the horizontal directions under the practical condition mounted on the vehicle, however, for convenience of explanation, the right side in the drawing at the drive source side of an engine etc. will be referred to as "front side" and the left side in the drawing will be referred to as "rear side".

First Embodiment

Schematic Configuration of Automatic Transmission

First, a schematic configuration of an automatic transmission 1 to which the invention may be applied will be explained with reference to FIG. 1.

As shown in FIG. 1, for example, the automatic transmission 1 preferably used in an FF type vehicle has an input shaft 5 of the automatic transmission that may be connected to an engine, and includes a torque converter 2 and an automatic transmission mechanism 3 in parallel to the shaft direction of the input shaft 5.

The torque converter 2 has a pump impeller 2a connected to the input shaft 5 of the automatic transmission 1 and a turbine runner 2b to which the rotation of the pump impeller 2a is transmitted via a working fluid, and the turbine runner 2b is connected to an input shaft 7 of the automatic transmission mechanism 3. Further, a lock-up clutch 2a is provided in the torque converter 2, and, when the lock-up clutch 2a is engaged, the rotation of the input shaft 5 of the automatic transmission 1 is directly transmitted to the input shaft 7 of the automatic transmission mechanism 3.

The automatic transmission mechanism 3 includes a planetary gear (deceleration planetary gear) DP and a planetary gear unit PU provided at the downstream of transmission of the planetary gear DP. The planetary gear DP is the so-called double-pinion planetary gear having a first sun gear S1, a first carrier CR1, and a first ring gear R1. In the first carrier CR1, a pinion P2 meshed with the first sun gear S1 and a pinion P1 meshed with the first ring gear R1 are meshed with each other.

On the other hand, the planetary gear unit PU is the so-called Ravigneaux planetary gear having a second sun gear S2, a third sun gear S3, a second carrier CR2, and a second ring gear R2 as four rotation elements. In the second carrier CR2, a long pinion P3 meshed with the second sun gear S2 and the second ring gear R2 and a short pinion P4 meshed with the third sun gear S3 are meshed with each other.

The rotation of the first sun gear S1 of the planetary gear DP is fixed relative to a gearbox case 6. Further, the first carrier CR1 is connected to the input shaft 7 and performs the same rotation as the rotation of the input shaft 7 (hereinafter, referred to as "input rotation"), and connected to a fourth clutch C-4. Furthermore, the first ring gear R1 performs decelerated rotation as the input rotation at a reduced speed by the fixed first sun gear S1 and the first carrier CR1 that performs input rotation, and connected to a first clutch C-1 and a third clutch (second friction engagement element) C-3.

The second sun gear S2 of the planetary gear unit PU is connected to a first brake B-1 to be fixable relative to the gearbox case 6. Further, the second sun gear S2 is connected to the fourth clutch C-4 and the third clutch C-3, and the input rotation of the first carrier CR1 is inputtable via the fourth clutch C-4 and the decelerated rotation of the first ring gear R1 is inputtable via the third clutch C-3, respectively. Furthermore, the third sun gear S3 is connected to the first clutch C-1, and the decelerated rotation of the first ring gear R1 is inputtable thereto.

Further, the second carrier CR2 is connected to the second clutch C-2 to which the rotation of the input shaft 7 is input and the input rotation is inputtable via the second clutch C-2, and connected to a one-way clutch F-1 and a second brake (first friction engagement element) B-2. Accordingly, the rotation of the second carrier CR2 in one direction is regulated relative to the gearbox case 6 via the one-way clutch F-1 and the rotation is fixable to the gearbox case 6 via the second brake B-2. Furthermore, the second ring gear R2 is connected to a counter gear 8, and the counter gear 8 is connected to a drive wheel via a counter shaft and a differential unit (not shown).

The above described automatic transmission 1 establishes shirt gears of forward first to eighth gears and a shirt gear of a reverse first gear by activating the respective clutches and the respective brakes in the combination shown in the activation table in FIG. 2. Though not shown in the activation table, the automatic transmission 1 engages the fourth clutch C-4 and engages to stop the second brake B2, and thereby, may establish a shirt gear of the reverse second gear.

[Schematic Configuration of Hydraulic Control System]

Subsequently, a hydraulic control system 10 of the automatic transmission according to the embodiment of the invention will be explained.

First, generation parts of a line pressure $P_L$, a secondary pressure, a modulator pressure $P_{MOD}$, and range pressures $P_D$, $P_{REV}$ will roughly be explained. These generation parts of the line pressure $P_L$, the secondary pressure, the modulator pressure $P_{MOD}$, and the range pressures $P_D$, $P_{REV}$ are the same as those of a hydraulic control system of a general automatic transmission and known, they will briefly be explained.

The hydraulic control system 10 includes an oil pump 4 shown in FIG. 1 and a manual shift valve (range pressure output unit) 21 and a linear solenoid valve SLT shown in FIG.

3, and additionally includes a primary regulator valve, a secondary regulator valve, a solenoid modulator valve, etc. (not shown). When an engine 9 (see FIG. 4) is started, for example, the oil pump 4 coupled to the pump impeller 2a of the torque converter 2 is driven according to the rotation of the engine 9, and generates hydraulic pressure by sucking up oil via a strainer from an oil pan (not shown).

The hydraulic pressure generated by the oil pump 4 is pressure-regulated to the line pressure $P_L$ while being drain-adjusted by the primary regulator valve based on a signal pressure $P_{SLT}$ of the linear solenoid valve SLT that is pressure-regulated and output in response to a throttle opening. The line pressure $P_L$ is supplied to the manual shift valve (range pressure output unit) 21, the solenoid modulator valve, and a linear solenoid valve SL3, etc. Of them, the line pressure $P_L$ supplied to the solenoid modulator valve is pressure-regulated to the modulator pressure $P_{MOD}$ substantially at constant pressure by the value and the modulator pressure $P_{MOD}$ is supplied as an original pressure of the linear solenoid valve SLT, on/off solenoid valves S1, S2, etc. (see FIG. 3).

On the other hand, the manual shift valve 21 as the range pressure output unit that outputs the range pressure of the forward range (D-range) pressure $P_D$, the reverse range (R-range) pressure $P_{REV}$, etc. has a spool 21p mechanically (or electrically) driven by the operation of a shift lever 41 provided in a driver's seat, the position of the spool 21p is switched in response to the shift range (for example, P, R, N, D) selected by the shift lever 41, and thereby, the output state and the non-output state (drain) of the input line pressure $P_L$ are set.

Figure 3:
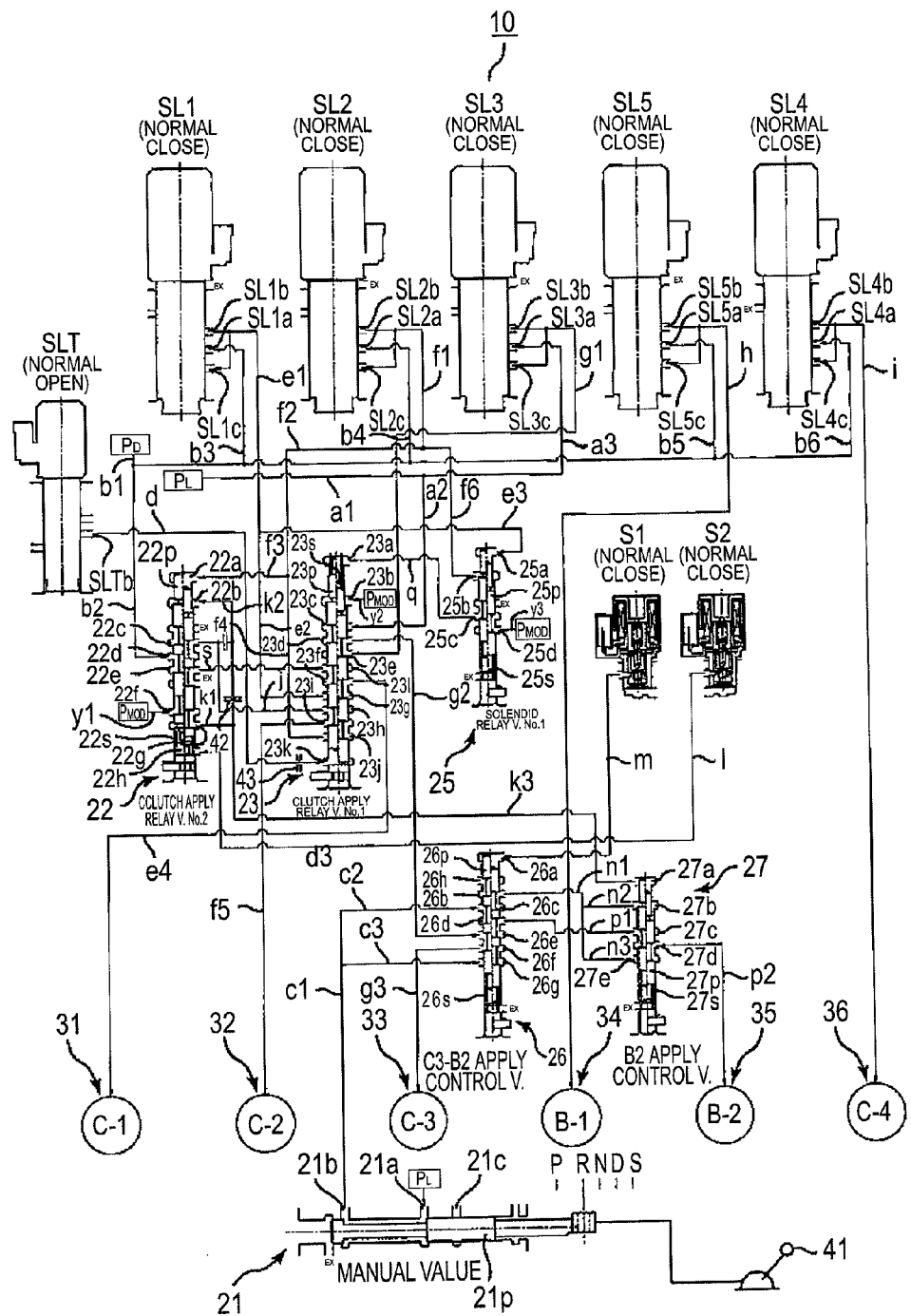
FIG. 3 is a hydraulic circuit diagram of a hydraulic control system of the automatic transmission according to the first embodiment of the invention.

Specifically, as shown in FIG. 3, when the forward range (D-range) is set according to the operation of the shift lever 41, an input port 21a to which the line pressure $P_L$ is input according to the position of the spool 21p and a forward range pressure output port 21c communicate with each other and the line pressure $P_L$ is output from the forward range pressure output port 21c as the forward range (D-range) pressure $P_D$.

Further, when the reverse range (R-range) is set according to the operation of the shift lever 41, the input port 21a and a reverse range pressure output port 21b communicate with each other according to the position of the spool 21p and the line pressure $P_L$ is output from the reverse range pressure output port 21b as the reverse range (R-range) pressure $P_{REV}$.

Note that, when the P-range and the N-range are set according to the operation of the shift lever 41, the input port 21a, the forward range pressure output port 21c, and the reverse range pressure output port 21b are blocked by the spool 21p, the forward range pressure output port 21c and the reverse range pressure output port 21b are communicated with the drain port EX, and the non-output state in which the D-range pressure $P_D$ and the R-range pressure $P_{REV}$ are drained is provided.

[Detailed Configuration of Shirt Gear Control Parts in Hydraulic Control System]

Next, the parts that mainly perform shirt gear control in the hydraulic control system 10 according to the invention will be explained with reference to FIG. 3. In the embodiment, for explanation of the spool position, the position of the right half shown in FIG. 3 will be referred to as "right-half position" and the position of the left half will be referred to as "left-half position".

The automatic transmission 1 includes five linear solenoid valves SL1, SL2, SL3, SL4, SL5 for directly supplying control pressures pressure-regulated as engagement pressures to the respective total six hydraulic servos of a hydraulic servo 31 of the above described clutch C-1, a hydraulic servo 32 of the clutch C-2, a hydraulic servo 33 of the clutch C-3, a hydraulic servo 34 of the brake B-1, a hydraulic servo 35 of the brake B-2, and a hydraulic servo 36 of the clutch C-4.

The linear solenoid valves SL1, SL2, SL3, SL4, SL5 are of normally-closed type that turn into the output state when energized, and respectively have input ports SL1a, SL2a, SL3a, SL4a, SL5a to which the original pressures are input, output ports SL1b, SL2b, SL3b, SL4b, SL5b for outputting the control pressures $P_{SL1}$, $P_{SL2}$, $P_{SL3}$, $P_{SL4}$, $P_{SL5}$ formed by pressure-regulating the original pressures as engagement pressures to the hydraulic servos 31, 32, 33, 34, 35, 36, and input ports SL1c, SL2c, SL3c, SL4c, SL5c to which the control pressures $P_{SL1}$, $P_{SL2}$, $P_{SL3}$, $P_{SL4}$, $P_{SL5}$ are fed back.

That is, the linear solenoid valves SL1, SL2, SL3, SL4, SL5 are adapted to turn into the non-output state in which the input ports SL1a, SL2a, SL3a, SL4a, SL5a and the output ports SL1b, SL2b, SL3b, SL4b, SL5b are blocked when non-energized, when energized according to an instruction value from a control unit (ECU) 50, increase the amounts of communication between the input ports and the output ports (opening amounts) in response to the instruction value, and output the control pressures (engagement pressures) in response to the instruction value.

Further, between the linear solenoid valves SL1, SL2, SL3, SL4, SL5 and the hydraulic servos 31, 32, 33, 34, 35, 36, as parts for achieving the reverse inhibit function, a dispensing valve (first switching valve, C3-B2 apply control valve) 26 that dispenses engagement pressures $P_{C3}$, $P_{B2}$ to the hydraulic servo 33 of the clutch C-3 and the hydraulic servo 35 of the brake B-2, a B2 apply control valve 27 that switches supply of the engagement pressure $P_{B2}$ to the hydraulic servo 35 of the brake B-2, and the above described first and second on/off solenoid valves S1, S2 that output the signal pressures $P_{S1}$, $P_{S2}$ for switching these dispensing valve 26 and B2 apply control valve 27 are provided.

Furthermore, between the linear solenoid valves SL1, SL2, SL3, SL4, SL5 and the hydraulic servos 31, 32, 33, 34, 35, 36, in addition to the above described valves 26, 27, S1, S2, as parts for achieving a limp home function, a first clutch apply relay valve 23 to be switched at all-off-fail, a second clutch apply relay valve 22 to be switched between the lower gears (forward first to fourth gears) and the higher gears (forward fifth to eighth gears), a solenoid relay valve 25 that outputs the modulator pressure $P_{MOD}$ to the first clutch apply relay valve 23 as the signal pressure, etc. are provided.

On the other hand, the forward range pressure output port 21c of the manual shift valve 21 is connected to oil paths b1 to b6 so that the forward range pressure $P_D$ as the original pressures of the linear solenoid valves SL1, SL2, SL4, SL5 may be input. The oil path b1 is connected to the input port 22d of the second clutch apply relay valve 22 via the oil path b2 and connected to the input ports SL1a, SL2a, SL4a, SL5a of the linear solenoid valves SL1, SL2, SL4, SL5 via the oil paths b3, b4, b5, b6.

Further, the line pressure $P_L$ from the primary regulator valve (not shown) is input to oil paths a1 to a3, and the oil path a1 is connected to the input port 23c of the first clutch apply relay valve 23 via the oil path a2, and connected to the input port SL3a of the linear solenoid valve SL3 via the oil path a3.

Further, of the output ports of the linear solenoid valves SL1 to SL5 from which the line pressure $P_L$ and the forward range pressure $P_D$ are pressure-regulated and output, the output port SL1b of the solenoid valve SL1 is connected to an input port 23g of the first clutch apply relay valve 23 via oil paths e1, e2 and connected to a hydraulic oil chamber 25a of the solenoid relay valve 25 via the oil paths e1, e3.

Furthermore, the output port SL2b of the linear solenoid valve SL2 is connected to an input port 23j of the first clutch apply relay valve 23 via oil paths f1, f2, f4, connected to a hydraulic oil chamber 22a of the second clutch apply relay valve 22 via the oil paths f1, f2, f3, and connected to a hydraulic oil chamber 25b of the solenoid relay valve 25 via the oil paths f1, f6.

In addition, the output port SL3b of the linear solenoid valve SL3 is connected to the input port 23e of the first clutch apply relay valve 23 via an oil path g1, and the output ports SL4b, SL5b of the linear solenoid valves SL4, SL5 are directly connected to the hydraulic servos 36, 35 of the clutch C-4/brake B-1 via oil paths i, h, respectively.

The above described second clutch apply relay valve 22 has a spool 22p and a spring 22s that urges the spool 22p upward in the drawing, has the hydraulic oil chamber 22a above the spool 22p in the drawing, the hydraulic oil chamber 22h below the spool 22p in the drawing, and the hydraulic oil chamber 21b formed by the difference between land diameters (the difference between pressurized areas) of the spool 22p, and further, has the input port 22d, the input port 22f, the output port 22e, and the drain port EX.

In the second clutch apply relay valve 22, as described above, the hydraulic oil chamber 22a is connected to the output port SL2b of the linear solenoid valve SL2 via the oil paths f1, f2, f3. Further, the control pressure $P_{SL2}$ is output from the output port SL2b of the linear solenoid valve SL2 at the higher gears (forward fifth to eighth gears), and thus, the spool 22p of the second clutch apply relay valve 22 is in the left-half position by the urging force of the spring 22s at the lower gears (forward first to fourth gears) and, at the higher gears, the control pressure $P_{SL2}$ is output to the hydraulic oil chamber 22a and the spool is in the right-half position.

In the second clutch apply relay valve 22, when the spool 22p is in the left-half position (the lower gear side position), the input port 22d and the output port 22e are communicated with each other and the input port 22d and the output port 22c, the input port 22f and the output port 22g are blocked. Further, when the spool is in the right-half position (the higher gear side position), the input port 22d and the output port 22c, the input port 22f and the output port 22g are communicated with each other and the communication between the input port 22g and the hydraulic oil chamber 22h is blocked.

To the input port 22d, the forward range pressure $P_D$ is input via the oil path b2 etc., and the output port 22e that communicates with the input port 22d when the spool 22p is in the left-half position is connected to an input port 23l of the first clutch apply relay valve 23 via an oil path s. Further, the output port 22c that communicates with the input port 22d when the spool 22p is in the right-half position is connected to an input port 23h of the first clutch apply relay valve 23 via an oil path j.

Furthermore, the modulator pressure $P_{MOD}$ is input to the input port 22f via an oil path y1, and the output port 22g that communicates with the input port 22f when the spool 22p is in the right-half position is connected to the hydraulic oil chamber 22b of the second clutch apply relay valve 22 via oil paths k1, k2, and connected to the hydraulic oil chamber 27a of the B2 apply control valve 27 via the oil paths k1, k3.

Further, the output port 22g communicates with the hydraulic oil chamber 22h of the first clutch apply relay valve 22 when the spool 22p is in the right-half position, and is connected to an oil path 1 to which the signal pressure $P_{S2}$ from the second on/off solenoid valve S2 is output. Note that, in the middle of the oil path k2 connected to the hydraulic oil chamber 22b, an orifice 42 is provided.

The first clutch apply relay valve 23 has a spool 23p and a spring 23s that urges the spool 23p downward in the drawing, has a hydraulic oil chamber 23a above the spool 23p in the drawing, a hydraulic oil chamber 23k below the spool 23p in the drawing, and further, a hydraulic oil chamber 23b formed by the difference between land diameters (the difference between pressurized areas) of the spool 23p, the input port 23c, the output port 23d, the input port 23e, the input port 23l, the output port 23f, the input port 23g, the input port 23h, the output port 23i, the input port 23j, and the input port 22k.

Further, the solenoid relay valve 25 having an output port 25c connected to the hydraulic oil chamber 23a via an oil path q has a spool 25p and a spring 25s that urges the spool 25p upward in the drawing in addition to the output port 25c, has a hydraulic oil chamber 25a above the spool 25p in the drawing, and further, a hydraulic oil chamber 25b formed by the difference between land diameters (the difference between pressurized areas) of the spool 25p, and an input port 25d to which the modulator pressure $P_{MOD}$ is input via an oil path y3.

The hydraulic oil chambers 25a, 25b are connected to the output ports SL1b, SL2b of the linear solenoid valves SL1, SL2 via the oil paths e1, e3 and the oil paths f1, f6, respectively, as described above, and thus, the spool 23p is in the right-half position in the normal state, and the output port 25c communicates with the input port 25d and outputs the modulator pressure $P_{MOD}$ to the hydraulic oil chamber 23a of the first clutch apply relay valve 23 as the signal pressure.

Further, in the first clutch apply relay valve 23, the hydraulic oil chamber 23b is connected to an oil path y2 to which the modulator pressure $P_{MOD}$ is output and a hydraulic oil chamber 23k is connected via the oil path d to an output port SLTb of the linear solenoid valve SLT of normal open type that turns into the output state when non-energized, and thus, in the normal state, the modulator pressure $P_{MOD}$ is output to the hydraulic oil chambers 23a, 23b as the signal pressure and the spool is in the right-half position, and, at failure of all-off-fail or the like, the supply of the modulator pressure $P_{MOD}$ to the hydraulic oil chamber 23a is blocked and a control pressure $P_{SLT}$ is supplied from the linear solenoid valve SLT to the hydraulic oil chamber 23k, and the spool is in the left-half position. Note that, in the oil path d, an orifice 43 is provided, and the amount of flow is restricted so that the hydraulic pressure from the linear solenoid valve SLT may not rapidly enter the hydraulic oil chamber 23k.

Further, in the first clutch apply relay valve 23, when the spool 23p is located in the right-half position (normal-state position), the input port 23e and the output port 23d are communicated with each other and the input port 23c is blocked, the input port 23g and the output port 23f are communicated with each other and the input port 23l is blocked, and further, the input port 23j and the output port 23i are communicated with each other and the input port 23h is blocked. Furthermore, when the spool is located in the left-half position (failure-state position), the input port 23c and the output port 23d are communicated with each other and the input port 23e is blocked, the input port 23l and the output port 23f are communicated with each other and the input port 23g is blocked, and further, the input port 23h and the output port 23i are communicated with each other and the input port 23j is blocked.

The input port 23g is connected to the output port SL1b of the linear solenoid valve SL1 via the oil paths e1, e2, and further, the input port 23l is connected to the output port 22e of the second clutch apply relay valve 22 via the oil path s. Furthermore, the output port 23f that communicates with the input port 23g when the spool 23p is in the right-half position and communicates with the input port 23l when the spool is in the left-half position is connected to the hydraulic servo 31 of the clutch C-1 via the oil path e4.

Similarly, the input port 23*j* is connected to the output port SL2*b* of the linear solenoid valve SL2 via the oil paths f1, f2, f4, and further, the input port 23*h* is connected to the output port 22*c* of the second clutch apply relay valve 22 via the oil path j. Furthermore, the output port 23*i* that communicates with the input port 23*j* when the spool 23*p* is in the right-half position and communicates with the input port 23*h* when the spool is in the left-half position is connected to the hydraulic servo 32 of the second clutch C-2 via the oil path f5.

Further, similarly, the input port 23*e* is connected to the output port SL3*b* of the linear solenoid valve SL3 via the oil path g1, and the line pressure $P_L$ is input to the input port 23*c* via the oil paths a1, a2. Furthermore, the output port 23*d* that communicates with the input port 23*e* when the spool 23*p* is in the right-half position and communicates with the input port 23*c* when the spool is in the left-half position is connected to the input port 26*e* of the dispensing valve 26 via the oil path g2.

The dispensing valve 26 has a spool 26*p* and a spring 26*s* that urges the spool 26*p* upward in the drawing, has a hydraulic oil chamber 26*a* above the spool 26*p* in the drawing, and further, has plural input ports 26*c*, 26*g* as reverse range pressure input ports connected to the reverse range pressure output port 21*b* of the manual shift valve 21, to which the reverse range pressure $P_{REV}$ is input, via the oil paths c1 to c3, an input port 26*e* as a control pressure input port to which the control pressure $P_{SL3}$ from the linear solenoid valve SL3 is input, an output port (first output port) 26*b*, an output port (second output port) 26*d*, an output port (third output port) 26*f*, and a drain port 26*h*.

Further, in the dispensing valve 26, the hydraulic oil chamber 26*a* is connected to the first on/off solenoid valve S1 (the solenoid valve that outputs the modulator pressure $P_{MOD}$ as the signal pressure $P_{S1}$ that may switch the dispensing valve 26 substantially as it is) of normally-closed type that turns into the non-output state when non-energized via an oil path m, and thus, when the signal pressure $P_{S1}$ is output from the first on/off solenoid valve S1 to the hydraulic oil chamber 26*a*, the spool is switched from the left-half position (first state) to the right-half position (second state).

Further, in the dispensing valve 26, when the spool 26*p* is located in the left-half position, the input port 26*c* and the output port 26*d*, the output port 26*b* and the drain port 26*h*, and the input port 26*e* and the output port 26*f* are communicated with each other, and the input port (the second reverse range pressure input port) 26*g* to which the reverse range pressure $P_{REV}$ is input is blocked in addition to the input port 26*c*. Furthermore, when the spool 26*p* is located in the right-half position, the input port 26*c* and the output port 26*b*, the input port 26*e* and the output port 26*d*, and the input port 26*g* and the output port 26*f* are communicated with each other, and the drain port 26*h* is blocked.

The output port 26*f* that communicates with the input port 26*e* when the spool 26*p* is in the left-half position is connected to the hydraulic servo 33 of the third clutch C-3. Further, similarly, an output port 26*d* that communicates with the input port 26*c* when the spool 26*p* is in the left-half position is connected to the input port 27*c* of the B2 apply control valve 27 via an oil path p1, and the output port 26*b* that communicates with the input port 26*c* when the spool 26*p* is in the right-half position is connected to the hydraulic oil chamber 27*b* and an input port 27*e* of the B2 apply control valve 27 via oil paths n1 to n3.

The B2 apply control valve 27 (second switching valve) has a spool 27*p* and a spring 27*s* that urges the spool 27*p* upward in the drawing, has an oil chamber 27*a* above the spool 27*p* in the drawing, and further, has a hydraulic oil chamber 27*b* formed by the difference between land diameters (the difference between pressurized areas) of the spool 27*p*, the input port (second input port) 27*c*, an output port (fourth output port) 27*d* connected to the hydraulic servo 35 of the second brake B2, the input port (first input port) 27*e*, and a drain port EX.

In the B2 apply control valve 27, when the signal pressure $P_{S2}$ from the second on/off solenoid valve S2 (i.e., the solenoid valve that outputs the modulator pressure $P_{MOD}$ as the signal pressure $P_{S2}$ that may switch the B2 apply control valve 27 substantially as it is) of normally-closed type that turns into the non-output state when non-energized or the modulator pressure $P_{MOD}$ is output to the hydraulic oil chamber 27*a* via the oil paths k1, k3, the spool is switched from the left-half position (third state) to the right-half position (fourth state).

Further, in the B2 apply control valve 27, when the spool 27*p* is located in the left-half position, the input port 27*c* and the output port 27*d* are communicated with each other, and, when the spool 27*p* is located in the right-half position, the input port 27*e* and the output port 27*d* are communicated with each other.

[Operation of Hydraulic Control System]

Figure 4:
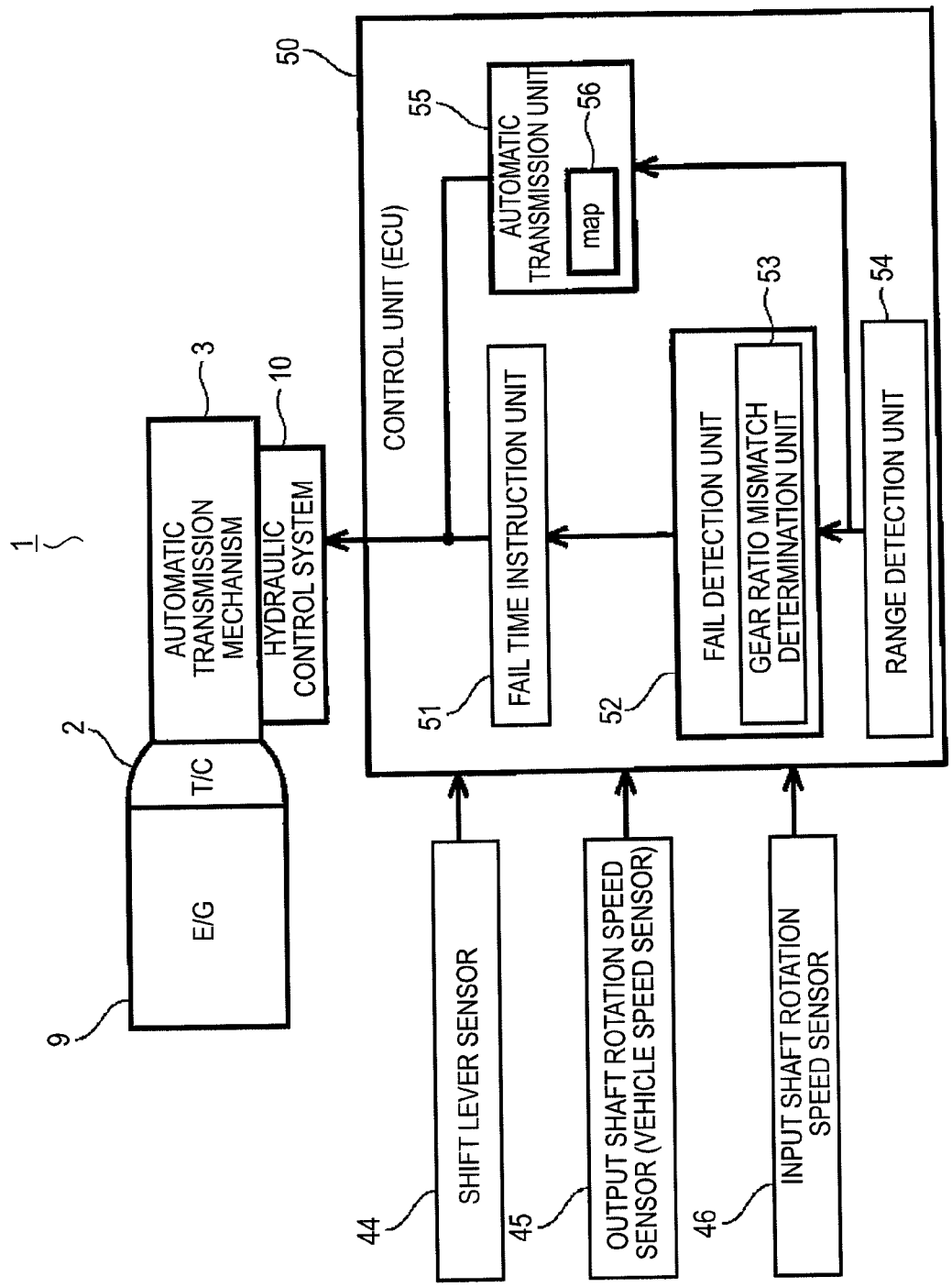
FIG. 4 is a block diagram of a control system of the automatic transmission according to the first embodiment of the invention.

Next, an action of the hydraulic control system 1 according to the embodiment will be explained with reference to FIGS. 3 to 5.

[Action at Forward First Gear]

For example, when the shift lever 41 is operated to the D-range and the forward first gear is determined by the control unit 50, the linear solenoid valve SL1 is turned on by the electric control of the control unit 50, the forward range pressure $P_D$ input to the input port SL1*a* is pressure-regulation controlled, the control pressure $P_{SL1}$ is output as the engagement pressure $P_{C1}$ to be larger gradually from the output port SL1*b*, and the control pressure $P_{SL1}$ (engagement pressure $P_{C1}$) is input to the input port 23*g* of the first clutch apply relay valve 23 via the oil paths e1, e2.

Then, the first clutch apply relay valve 23 set in the left-half position outputs the control pressure $P_{SL1}$ input to the input port 23*g* from the output port 23*f*, the pressure is input to as the engagement pressure $P_{C1}$ to the hydraulic servo 31 via the oil path e4, and the clutch C1 is engaged. Thereby, the forward first gear is achieved in combination with the engagement and stop of the one-way clutch.

[Operation in Engine Brake of Forward First Gear]

Further, for example, when the engine brake of the forward first gear is determined by the control unit 50, according to the electric instruction from the control unit 50, with the first on/off solenoid valve S1 on, the second on/off solenoid valve S2 is turned off, and further, the linear solenoid valve SL3 is pressure-regulation controlled. Then, the signal pressure $P_{S1}$ of the first on/off solenoid valve S1 is input to the oil chamber 26*a* of the dispensing valve 26 via the oil path m, the spool 26*p* is switched downward in the drawing against the urging force of the spring 26*s*, the dispensing valve 26 is set in the right-half position. Further, since the second on/off solenoid valve S2 is off, the signal pressure $P_{S2}$ of the second on/off solenoid valve S2 is not output to the oil chamber 27*a* of the B2 apply control valve 27, and the spool 27*p* remains locked in the left-half position due to the urging force of the spring 27*s*.

Then, when the linear solenoid valve SL3 is pressure-regulation controlled and the control pressure $P_{SL3}$ is output from the output port SL3*b*, the control pressure $P_{SL3}$ is input to the input port 23*e* of the first clutch apply relay valve 23 locked in the right-half position via the oil path g1 and output as the engagement pressure $P_{B2}$ from the output port 23*d* into the oil path g2.

The engagement pressure $P_{B2}$ output into the oil path g2 is input to the input port 26e of the dispensing valve 26 in the right-half position and output from the output port 26d. Further, the engagement pressure $P_{B2}$ is input to the input port 27c of the B2 relay valve 27 in the left-half position via the oil path p1, output from the output port 27d, input to the hydraulic servo 35 via the oil path p2, and the brake B2 is engaged and stopped. Thereby, the engine brake of the forward first gear is achieved in combination of the engagement of the clutch C-1. In this regard, the engagement pressure $P_{B2}$ to the hydraulic servo 35 is pressure-regulated to be larger gradually by the linear solenoid valve SL3 and supplied so that the gear shift shock may not be caused.

[Operation at Forward Second Gear]

Then, for example, when the forward second gear is determined from the state of the forward first gear by the control unit 50, while the pressure regulation state of the linear solenoid valve SLC1 is maintained, the pressure regulation of the linear solenoid valve SL5 is controlled. That is, when the linear solenoid valve SL5 is pressure-regulation controlled, the control pressure $P_{SL5}$ is output as the engagement pressure $P_{B1}$ from the output port SL5b, input to the hydraulic servo 34 via the oil path h, and the brake B-1 is engaged and stopped. Thereby, the forward second gear is achieved in combination of the engagement of the clutch C-1.

[Operation at Forward Third Gear]

Subsequently, for example, when the forward third gear is determined from the state of the forward second gear by the control unit 50, according to the electric instruction from the control unit 50, while the pressure regulation state of the linear solenoid valve SL1 is maintained, the linear solenoid valve SL5 is turned off and closed, and pressure regulation of the linear solenoid valve SL3 is controlled.

That is, first, release control of the brake B-1 is performed by the pressure-regulation control of the linear solenoid valve SL5, i.e., the engagement pressure $P_{B1}$ (control pressure $P_{SL5}$) of the hydraulic servo 34 of the brake B-1 is drain-controlled from the drain port EX of the linear solenoid valve SL5 via the oil path h, and the brake B-1 is released. Further, on the other hand, the linear solenoid valve SL3 is turned on (energized), the pressure regulation of the control pressure $P_{SL3}$ is controlled, the control pressure $P_{SL3}$ is output as the engagement pressure $P_{C3}$ from the output port SL3b, and input to the input port 23e of the first clutch apply relay valve 23 via the oil path g1. Further, since the spool 23p is locked in the right-half position due to the signal pressure $P_{MOD}$ of the hydraulic oil chambers 23a, 23b and the urging force of the spring 23s as described above, the first clutch apply relay valve 23 outputs the engagement pressure $P_{C3}$ input to the input port 23e from the output port 23d via the oil path g2 into the input port 26e of the dispensing valve 26, the dispensing valve 26 in which the spool 26p is locked in the left-half position due to the urging force of the spring 26s outputs the engagement pressure $P_{C3}$ input to the input port 26e to the hydraulic servo 33, and the clutch C-3 is engaged. Thereby, the forward third gear is achieved in combination of the engagement of the clutch C-1.

[Operation at Forward Fourth Gear]

Then, for example, when the forward fourth gear is determined from the state of the forward third gear by the control unit 50, according to the electric instruction from the control unit 50, while the pressure regulation state of the linear solenoid valve SL1 is maintained, the linear solenoid valve SL3 is turned off and closed, and pressure regulation of the linear solenoid valve SL4 is controlled.

That is, release control of the clutch C-3 is performed by the pressure-regulation control of the linear solenoid valve SL3, i.e., the engagement pressure $P_{C3}$ (control pressure $P_{SLC3}$) of the hydraulic servo 33 of the clutch C-3 is drain-controlled from the drain port EX of the linear solenoid valve SLC3 via the oil paths g1 to g3, and the clutch C-3 is released.

Further, the linear solenoid valve SL4 is turned on (energized), the pressure regulation of the control pressure $P_{SL4}$ is controlled, the control pressure $P_{SL4}$ is output as the engagement pressure $P_{C4}$ from the output port SL4b, and input to the hydraulic servo 36 via the oil path i, and the clutch C-4 is engaged. Thereby, the forward fourth gear is achieved in combination of the engagement of the clutch C-1.

[Operation at Forward Fifth Gear]

Then, for example, when the forward fifth gear is determined from the state of the forward fourth gear by the control unit 50, according to the electric instruction from the control unit 50, while the pressure regulation state of the linear solenoid valve SL1 is maintained, the linear solenoid valve SL4 is turned off and closed, and pressure regulation of the linear solenoid valve SL2 is controlled.

That is, first, release control of the clutch C-4 is performed by the pressure regulation control of the linear solenoid valve SL4, i.e., the engagement pressure $P_{C4}$ (control pressure $P_{SL4}$) of the hydraulic servo 36 of the clutch C-4 is drain-controlled from the drain port EX of the linear solenoid valve SL4 via the oil path i, and the clutch C-4 is released. Further, on the other hand, the linear solenoid valve SL2 is turned on (energized), the pressure regulation of the control pressure $P_{SL2}$ is controlled, the control pressure $P_{SL2}$ is output as the engagement pressure $P_{C2}$ from the output port SL2b, and input to the hydraulic servo 32 via the oil paths f1, f2, the first clutch apply relay valve 23, and the oil path f5, and the clutch C-2 is engaged. Thereby, the forward fifth gear is achieved in combination of the engagement of the clutch C-1.

Note that, when the control pressure $P_{SL2}$ is output from the output port SL2b of the linear solenoid valve SL2, the control pressure $P_{SL2}$ is also supplied to the hydraulic oil chamber 22a of the second clutch apply relay valve 22 via the oil paths f1, f2, f3, and the second clutch apply relay valve 22 is switched to the right-half position.

Then, the input port 22f and the output port k1 of the second clutch apply relay valve 22 communicate with each other, and the modulator pressure $P_{MOD}$ is input to the hydraulic oil chamber 22b via the oil paths k1, k2, and the second clutch apply relay valve 22 is locked in the right-half position. Further, the modulator pressure $P_{MOD}$ output from the output port k1 is also input to the hydraulic oil chamber 27a of the B2 apply relay valve 27 via the oil paths k1, k3, and the B2 apply relay valve 27 is switched to the right-half position so that the control pressure from the linear solenoid valve SL3 may not be supplied to the hydraulic servo 35 of the second brake B2.

[Operation at Forward Sixth Gear]

Then, for example, when the forward sixth gear is determined from the state of the forward fifth gear by the control unit 50, according to the electric instruction from the control unit 50, while the pressure regulation state of the linear solenoid valve SL2 is maintained, the linear solenoid valve SL1 is turned off, and pressure regulation of the linear solenoid valve SL4 is controlled.

That is, first, release control of the clutch C-1 is performed by the pressure regulation control of the linear solenoid valve SL1, i.e., the engagement pressure $P_{C1}$ (control pressure $P_{SL1}$) of the hydraulic servo 31 of the clutch C-1 is drain-controlled from the drain port EX of the linear solenoid valve SL1 via the oil paths e1, e2, the first clutch apply relay valve 23, and the oil path e4, and the clutch C-1 is released. Further, on the other hand, as is the case of the forward fourth gear, the linear solenoid valve SL4 is turned on (energized), pressure-regulation controlled, the control pressure $P_{SL4}$ is output as the engagement pressure $P_{C4}$ from the output port SL4b, and input to the hydraulic servo 36 via the oil path i, and the clutch C-4 is engaged. Thereby, the forward sixth gear is achieved in combination of the engagement of the clutch C-2.

[Operation at Forward Seventh Gear]

Then, for example, when the forward seventh gear is determined from the state of the forward sixth gear by the control unit 50, according to the electric instruction from the control unit 50, while the pressure regulation state of the linear solenoid valve SL2 is maintained, the linear solenoid valve SL4 is turned off, and pressure regulation of the linear solenoid valve SL3 is controlled.

That is, first, release control of the clutch C-4 is performed by the pressure regulation control of the linear solenoid valve SL4, i.e., the engagement pressure $P_{C4}$ (control pressure $P_{SL4}$) of the hydraulic servo 36 of the clutch C-4 is drain-controlled from the drain port EX of the linear solenoid valve SL4 via the oil path i, and the clutch C-4 is released. Further, on the other hand, as is the case of the forward third gear, the linear solenoid valve SL3 is turned on (energized) and pressure-regulation controlled, the control pressure $P_{SL3}$ is output as the engagement pressure $P_o$ from the output port SL3b, and input to the hydraulic servo 33 via the oil path g1, the first clutch apply relay valve 23, and the oil path g2, the dispensing valve 26, and the oil path g3, and the clutch C-3 is engaged. Thereby, the forward seventh gear is achieved in combination of the engagement of the clutch C-2.

[Operation at Forward Eighth Gear]

Then, for example, when the forward eighth gear is determined from the state of the forward seventh gear by the control unit 50, according to the electric instruction from the control unit 50, while the pressure regulation state of the linear solenoid valve SL2 is maintained, the linear solenoid valve SL3 is turned off, and pressure regulation of the linear solenoid valve SL5 is controlled.

That is, first, release control of the clutch C-3 is performed by the pressure regulation control of the linear solenoid valve SL3, i.e., the engagement pressure $P_{C3}$ (control pressure $P_{SL3}$) of the hydraulic servo 33 of the clutch C-3 is drain-controlled from the drain port EX of the linear solenoid valve SL3 via the oil path g1, the first clutch apply relay valve 23, the oil path g2, the dispensing valve 26, and the oil path g3, and the clutch C-3 is released. Further, on the other hand, as is the case of the forward second gear, the linear solenoid valve SL5 is turned on (energized), pressure regulation controlled, the control pressure $P_{SL5}$ is output as the engagement pressure $P_{B1}$ from the output port SL5b, and input to the hydraulic servo 34 via the oil path h, and the brake B1 is engaged. Thereby, the forward eighth gear is achieved in combination of the engagement of the clutch C-2.

[Operation at Reverse First Gear]

Further, for example, when the shift lever 41 is operated to the R-range position, the reverse range pressure $P_{REV}$ is output from the reverse range pressure output port 21b of the manual shift valve 21 as described above, and the reverse range pressure $P_{REV}$ is input to the input ports 26c, 26g of the dispensing valve 26 via the oil paths c1 to c3. Since the spool 26p of the dispersing valve 26 is locked in the left-half position due to the urging force of the spring 26s, the reverse range pressure $P_{REV}$ input to the input port 26c is input from the output port 26d to the input port 27c of the B2 apply clutch valve 27 via the oil path p1. Further, since the B2 apply control valve 27 is also locked in the left-half position due to the urging force of the spring 27s, the reverse range pressure $P_{REV}$ input to the input port 27c is output from the output port 27d via the oil path p2 to the hydraulic servo 35, and the second brake B-2 is engaged and stopped.

Concurrently, when, the shift lever in the R-range position is detected by a range detection unit 54 and the R-range is determined as the shift lever position by the control unit 50, the linear solenoid valve SL3 is pressure-regulation controlled to gradually output the control pressure $P_{SL3}$ by the control unit 50, the pressure is output as the engagement pressure $P_o$ from the output port SL3b, input to the hydraulic servo 33 via the oil path g1, the first clutch apply relay valve 23, the oil path g2, the dispensing valve 26, and the oil path g3, that is, the clutch C-3 is gradually engaged. Thereby, the reverse gear is achieved in combination of the engagement of the brake B-2.

[Operation at Reverse Inhibit]

Further, for example, when the shift lever 41 is operated to the R-range position by a driver, if the vehicle speed equal to or more than a predetermined speed in the forward direction is detected by an output shaft rotation speed sensor (vehicle speed sensor) 45, the second on/off solenoid valve S2 is turned on by the control unit 50 and the drain control is performed by the linear solenoid valve SL3.

That is, when the second on/off solenoid valve S2 is turned on, the signal pressure $P_{S2}$ from the second on/off solenoid valve S2 is input to the hydraulic oil chamber 22h of the second clutch apply relay valve 22, input around the hydraulic oil chamber 22h from the output port 22g to the hydraulic oil chamber 27a of the B2 apply control valve 27 via the oil paths k1, k3. When the signal pressure $P_{S2}$ is input to the hydraulic oil chamber 27a, the B2 apply control valve 27 is switched to the right-half position against the urging force of the spring 27s, and the output port 27d communicating with the hydraulic servo 35 of the second brake B2 communicates with the drain port 26h of the dispensing valve 26 locked in the left-half position due to the urging force of the spring 26s via the input port 27e, the oil paths n3, n1, and the output port 26b.

Further, the hydraulic servo 33 of the linear solenoid valve SL3 is communicated with the drain port EX of the linear solenoid valve SL3 via the oil path g3, the dispensing valve 26, the oil path g2, the first clutch apply relay valve 23, and the oil path g1. Then, the oil pressures of the hydraulic servos 35, 33 of the second brake B-2 and the clutch C-3 establishing the reverse gear is drained from the dispensing valve 26 and the drain port EX of the linear solenoid valve SL3 for prevention of achievement of the reverse first gear, and thereby, the so-called reverse inhibit function is performed.

Note that, in the B2 apply control valve 27, at the higher gears (forward fifth to eighth gears), the spool 22p of the second clutch apply relay valve 22 is switched to the right-half position and the output port k1 and the input port 22f to which the modulator pressure $P_{MOD}$ is input communicate with each other, and, not the signal pressure $P_{S2}$ from the second on/off solenoid valve S2, but the modulator pressure $P_{MOD}$ is used as the holding pressure for holding the spool 27p in the right-half position so that the reverse gear is not established in the forward traveling, and thereby, the power consumption of the second on/off solenoid valve S2 may be suppressed.

[Operation of Parts Related to Reverse Inhibit Function at Fail]

Next, the case where one of the linear solenoid valve SL3, the dispensing valve 26, and the B2 apply control valve 27 for achieving the above described reverse inhibit function fails will be explained.

[Case where Linear Solenoid Valve SL3 Fails]

First, the case where the control pressure $P_{SL3}$ is not output from the output port SL3b from the linear solenoid valve SL3 will be explained. As shown in FIG. 4, the control unit 50 includes the range detection unit 54 that detects the selected range based on the signal from a shift lever sensor 44 for sensing the position of the shift lever 41, a gear ratio mismatch determination unit 53 that calculates the actual gear ratio based on signals from an input shaft rotation speed sensor 46 and the output shaft rotation speed sensor 45 and determines whether the calculated gear ratio and the gear ratio in the range detected by the range detection unit 54 are the same or not, a fail detection unit 52 that determines as a failure if the gear ratio mismatch determination unit has determined that the actual gear ratio is out of the range of the gear ratio of the selected range, a fail time instruction unit 51 that gives an instruction to the hydraulic control system when the fail detection unit 52 detects a failure, and an automatic transmission unit 55 having a transmission map.

Figure 5:
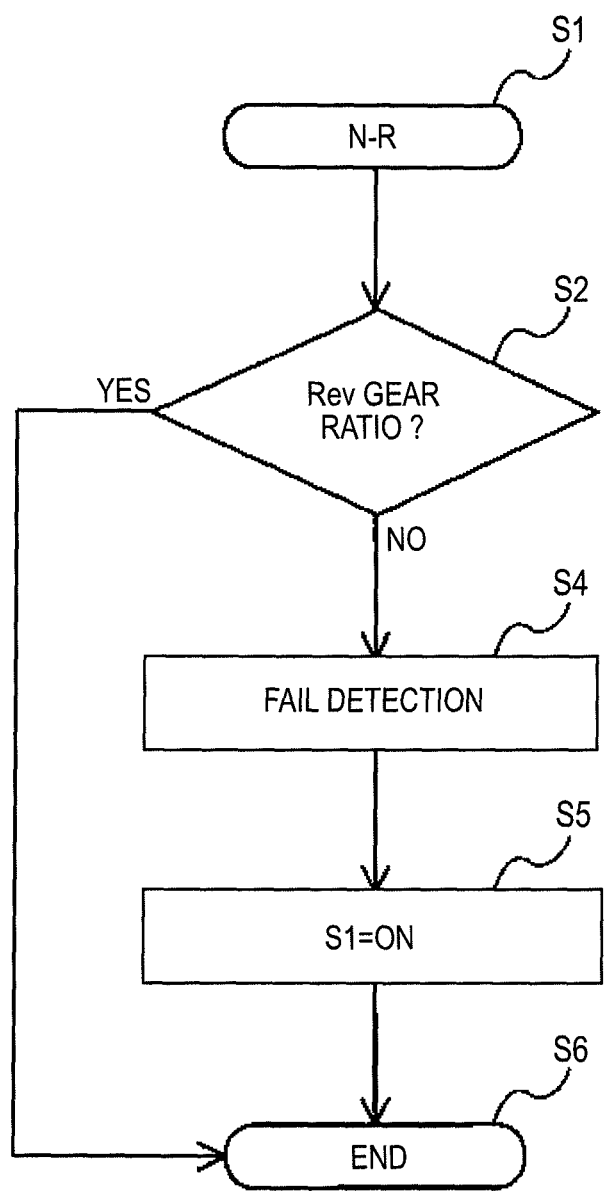
FIG. 5 is a flowchart of the control system of the automatic transmission according to the first embodiment of the invention.

As shown in FIG. 5, when the driver operates the shift lever 41 to the R-range, the range detection unit 54 detects that the R-range (reverse range) has been selected from the signal from the shift lever sensor 44, and outputs it to the fail detection unit 52 and the automatic transmission unit 55 (step S1).

The gear ratio mismatch determination unit 53 detects the actual gear ratio of the automatic transmission 1 based on the signals from the input shaft rotation speed sensor 46 and the output shaft rotation speed sensor 45, and determines whether the gear ratio is the same as the gear ratio at R-range detected by the range detection unit (step S2).

Then, if the detected actual gear ratio is within the range of the gear ratio at R-range, the control is ended without any operation (step S6), and, if the detected actual gear ratio is out of the range of the gear ratio at R-range, the fail detection unit 52 detects a failure because the reverse gear is not correctly formed (step S4).

If the fail detection unit 52 detects the failure not to form the reverse gear, the fail time instruction unit 51 outputs the signal pressure $P_{S1}$ to the first on/off solenoid valve S1 to give an instruction to switch the dispensing valve 26 to the right-half position (the second state) (step S5), and the control ends (step S6).

If the first on/off solenoid valve S1 is turned on based on the instruction from the fail time instruction unit 51, as shown in FIG. 3, the signal pressure $P_{S1}$ is output to the hydraulic oil chamber 26a of the dispensing valve 26 via the oil path m, and the spool 26p is switched to the lower side (the right-half position, the second state) against the urging force of the spring 26s.

Then, the input port 26f of the dispensing valve 26 connected to the reverse range pressure output port 21b of the manual valve 21b via the oil paths c1, c3 and the output port 26f connected to the hydraulic servo 33 communicate with each other, the reverse range pressure $P_{REV}$ is output to the hydraulic servo 33, and thereby, the third clutch C-3 is engaged.

Further, when the dispensing valve 26 is switched from the left-half position to the right-half position, the input port 26c of the dispensing valve 26 connected to the reverse range pressure output port 21b of the manual valve 21b via the oil paths c1, C2 and the output port 26b communicate with each other, and the reverse range pressure $P_{REV}$ is input to the hydraulic oil chamber 27b and the input port 27e of the B2 apply valve 27 via the oil paths n1, n2.

Then, when the reverse range pressure $P_{REV}$ is input to the hydraulic oil chamber 27b, the spool 27p is switched to the lower side (right-half position, the fourth state) against the urging force of the spring 27s, the reverse range pressure $P_{REV}$ is supplied as the engagement pressure $P_{B2}$ from the output port 27e via the output port 27d, the oil path p2 to the hydraulic servo 35, and the second brake B-2 is engaged and stopped. Thereby, the reverse gear is established in combination with the third clutch C-3.

[Case where B2 Apply Control Valve Fails]

Next, the case where a failure that it is impossible to move the spool 27p of the B2 apply control valve 27 from the right-half position such that the B2 apply control valve 27 is stuck in the right-half position or the signal pressure $P_{S2}$ is continuously output from the second on/off solenoid valve S2 is caused will be explained. The fail detection method itself is the same as that at fail of the linear solenoid valve SL3, and it will be omitted.

If the first on/off solenoid valve S1 is turned on based on the instruction from the fail time instruction unit 51, as shown in FIG. 3, the signal pressure $P_{S1}$ is output to the hydraulic oil chamber 26a of the dispensing valve 26 via the oil path m, and the spool 26p is switched to the lower side (the right-half position, the second state) against the urging force of the spring 26s.

Then, the input port 26g of the dispensing valve 26 connected to the reverse range pressure output port 21b of the manual valve 21b via the oil paths c1, c3 and the output port 26f connected to the hydraulic servo 33 communicate with each other, the reverse range pressure $P_{REV}$ is output to the hydraulic servo 33, and thereby, the third clutch C-3 is engaged.

Further, when the dispensing valve 26 is switched from the left-half position to the right-half position, the input port 26c of the dispensing valve 26 connected to the reverse range pressure output port 21b of the manual valve 21b via the oil paths c1, C2 and the output port 26b communicate with each other, and the reverse range pressure $P_{REV}$ is input to the hydraulic oil chamber 27b and the input port 27e of the B2 apply control valve 27 via the oil paths n1, n2.

Concurrently, the B2 apply control valve 27 is stuck in the right-half position, and thus, the reverse range pressure $P_{REV}$ is supplied as the engagement pressure $P_{B2}$ from the output port 27e via the output port 27d, the oil path p2 to the hydraulic servo 35, and the second brake B-2 is engaged and stopped. Thereby, the reverse gear is formed in combination with the third clutch C-3.

[Case where Dispensing Valve Fails]

Next, the case where a failure that it is impossible to move the spool 26p of the dispensing valve 26 from the left-half position such that the dispensing valve 26 is stuck in the left-half position or the signal pressure may not be output from the first on/off solenoid valve S1 is caused will be explained.

If the spool 26p is in the left-half position, in the dispensing valve 26, the input port 26e and the output port 26f communicate with each other, the control pressure $P_{SL3}$ is output from the linear solenoid valve SL3 to the hydraulic servo 33, and the third clutch C-3 is engaged.

Further, since the input port 26c to which the reverse range pressure $P_{REV}$ is input via the oil paths c, C2 and the output port 26d communicate with each other, the reverse range pressure $P_{REV}$ is output from the output port 26d via the oil path p1 to the input port 27c of the B2 apply control valve 27.

Concurrently, in the B2 apply control valve 27, the spool 27p is in the left-half position due to the urging force of the spring 27s, and thus, the reverse range pressure $P_{REV}$ input to the input port 27c is supplied to the hydraulic servo 35 via the output port 27d, the oil path p2, and the second brake B-2 is engaged and stopped. Thereby, the reverse gear is formed in combination with the third clutch C-3.

As described above, the hydraulic control system 10 of the automatic transmission 1 includes the plural input ports 26c, 26g to which the reverse range pressure $P_{REV}$ is input and the input port 26e to which the control pressure $P_{SL3}$ of the linear solenoid valve SL3 is input in the dispensing valve 26, and, when the spool 26p is in the left-half position, the control pressure $P_{SL3}$ from the linear solenoid valve SL3 may be supplied as the engagement pressure to the hydraulic servo 33, and, when the spool 26p is in the right-half position, the reverse range pressure $P_{REV}$ input to the input port 26g may be supplied as the engagement pressure to the hydraulic servo 33, and thereby, even in the case where the spool 26p of the dispensing valve 26 is stuck or the case where the control pressure $P_{SL3}$ of the linear solenoid valve SL3 may not be output, the third clutch C-3 may be engaged.

Further, if it may be impossible to move the spool 27p of the B2 apply control valve 27 because, when the control pressure $P_{SL3}$ from the linear solenoid valve SL3 is output to the hydraulic servo 33 of the third clutch C-3, the reverse range pressure $P_{REV}$ is output from the output port 26d of the dispensing valve 26 to the input port 27c of the B2 apply control valve 27, and, when the reverse range pressure $P_{REV}$ is supplied from the input port 26g to the hydraulic servo 33 of the third clutch C-3, the control pressure $P_{SL3}$ from the linear solenoid valve SL3 is output from the output port 26d to the input port 27c of the B2 apply control valve 27, the reverse range pressure $P_{REV}$ or the control pressure $P_{SL3}$ may be supplied as the engagement pressure $P_{B2}$ to the hydraulic servo 35, and the second brake B2 may be engaged and stopped.

Thereby, even when only one of the linear solenoid valve SL3, the dispensing valve 26, and the B2 apply control valve 27 that achieve the reverse inhibit function fails, the reverse gear may be achieved. Further, at engine brake, the second brake B2 may be pressure-regulation controlled by the linear solenoid valve SL3, and thus, the B2 apply control valve 27 may be switched not by a linear solenoid but by the simple second on/off solenoid valve S2 and the cost may be reduced.

Furthermore, in the B2 apply control valve 27, in addition to the hydraulic oil chamber 27a, the hydraulic oil chamber 27b that can switch the spool 2'7p from the left-half position to the right-half position where the reverse range pressure $P_{REV}$ may be output from the input port 27e to the hydraulic servo 35 of the second brake B-2 is provided, the hydraulic oil chamber 27b and the oil path n1 connecting the output port 26b of the dispensing valve 26 for outputting the reverse range pressure $P_{REV}$ and the input port 27e of the B2 apply control valve 27 are connected, and thereby, the B2 apply control valve 27 may be switched according to the dispensing valve 26 independent of the signal pressure $P_{S2}$ of the second on/off solenoid valve S2.

That is, when the B2 apply control valve 27 is switched from the left-half position to the right-half position as the first on/off solenoid valve S1 is turned on by the fail time instruction unit 51 of the control unit 50 and the dispensing valve 26 is switched from the left-half position to the right-half position, the B2 apply control valve 27 may switch the spool 27p by outputting the reverse range pressure $P_{REV}$ to the hydraulic oil chamber 27b without depending on the signal pressure $P_{S2}$ from the second on/off solenoid valve S2. Thereby, the power consumption of the second on/off solenoid valve S2 may be suppressed.

Further, when detecting a failure that the reverse gear has not been established, the control unit 50 gives an instruction to the first on/off solenoid valve S1 using the fail time instruction unit 51 to switch the dispensing valve to the right-half position, and the reverse gear may reliably be formed.

Note that, in the above described embodiment, the reverse range pressure $P_{REV}$ is input to the two input ports 26c, 26g of the dispensing valve 26, however, for example, the input port 26c may be split into two and three ports may be used, and the reverse range pressure $P_{REV}$ may selectively be output from the output port 26b by the spool 26p. Further, when the spool 26p is in the left-half position, the reverse range pressure $P_{REV}$ input to the input port 26g may be output to the oil path n1.

Furthermore, a hydraulic sensor that detects the control pressure of the linear solenoid valve SL3 may be provided, and the fail detection unit may determine the type of failure based on the signal from the hydraulic sensor.

Further, as the range pressure output unit, not only the manual shift valve but also a shift-by-wire system may naturally be employed.

Furthermore, the case where the hydraulic control system 10 of the automatic transmission is applied to the automatic transmission 1 that achieves the forward eight gears and reverse single gear has been explained as an example, not limited to that, but, for example, the system may be applied to an automatic transmission that achieves forward six gears, and the invention may be applied to any automatic transmission as long as it is an automatic transmission performing stepped transmission.

Second Embodiment

Next, the second embodiment of the invention will be explained with reference to FIG. 6. The hydraulic control system 10 in FIG. 6 is a hydraulic control system for an automatic transmission of forward six gears, and different from the hydraulic control system of the first embodiment in that the fourth clutch C-4 and the linear solenoid valve SL4 are not provided, and the control pressure $P_{SL2}$ from the linear solenoid valve SL2 is dispensed to the hydraulic servo 32 of the second clutch C-2 and the hydraulic servo 35 of the second brake B-2 using a dispensing valve 70, and, the rest basically has the same configurations as those in the first embodiment and their explanation and illustration will be omitted.

Further, in the second embodiment, the same reference numbers and names will be used for the same configuration and the actions as those of the first embodiment, and a linear solenoid valve SLB1 is a linear solenoid valve corresponding to the linear solenoid valve SL5 of the first embodiment. Furthermore, the dispensing valve 70 is a valve corresponding to the dispensing valve 26 of the first embodiment, and a B2 apply control valve 70 is a valve corresponding to the B2 apply control valve 27 of the first embodiment.

Figure 6:
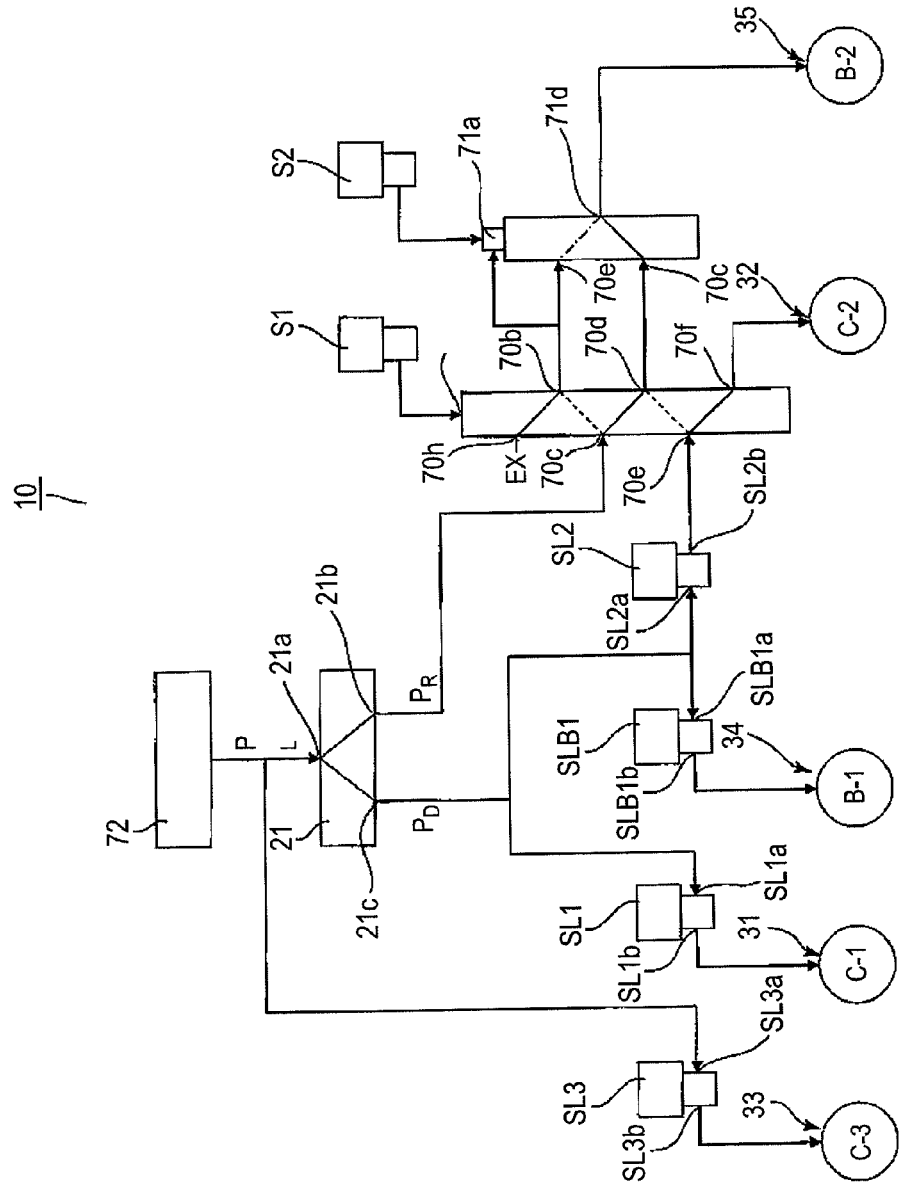
FIG. 6 is a hydraulic circuit diagram of a hydraulic control system of an automatic transmission according to a second embodiment of the invention.

As shown in FIG. 6, the automatic transmission includes friction engagement elements of the first clutch C-1 that is engaged when the forward first gear and the forward fourth gear are established, the second clutch C-2 that is engaged when the forward fourth gear and the forward sixth gear are established, the third clutch C-3 that is engaged when the forward third gear and the forward fifth gear are established, the first brake B-1 that is engaged when the forward second gear and the forward sixth gear are established, and the second brake B-2 that is engaged when the engine brake of the forward first gear is established and the reverse gear is established, and the hydraulic control system 10 of the automatic transmission has the hydraulic servos 31, 32, 33, 34, 35 of the above described friction engagement elements.

Further, the hydraulic control system 10 includes the four linear solenoid valves SL1, SL2, SL3, SLB1 for directly supplying the control pressures pressure-regulated as the engagement pressures to the respective hydraulic servos 31, 32, 33, 34, 35. These linear solenoid valves SL1, SL2, SL3, SLB1 are of normally-closed type that turn into the output state when energized, and respectively have input ports SL1$a$, SL2$a$, SL3$a$, SLB1$a$ to which the original pressures are input, and output ports SL1$b$, SL2$b$, SL3$b$, SL4$b$, SL5$b$ for outputting the control pressures $P_{SL1}$, $P_{SL2}$, $P_{SL3}$, $P_{SLB1}$ formed by pressure-regulating the original pressures as engagement pressures to the hydraulic servos 31, 32, 33, 34, 35.

The line pressure $P_L$ pressure-regulated by a primary regulator valve 72 is directly supplied as the original pressure to the input port SL3$a$ of the linear solenoid valve SL3, and the line pressure $P_L$ is supplied via the manual valve 21 to the input ports SL1$a$, SL2$a$, SLB1$a$ of the linear solenoid valves SL1, SL2, SLB1. More specifically, the input ports SL1$a$, SL2$a$, SLB1$a$ of the linear solenoid valves SL1, SL2, SLB1 are connected to the forward range pressure output port 21$c$ that communicates with the input port 21$a$ to which the line pressure $P_L$ pressure-regulated by the primary regulator valve 72 is input at the forward range, and the D-range pressure $P_D$ as the line pressure $P_L$ output from the forward range pressure output port 21$c$ at the forward range is output as the original pressure.

On the other hand, the output ports SL1$b$, SL3$b$, SLB1$b$ of the linear solenoid valves SL1, SL3, SLB1 are connected to the respective hydraulic servos 31, 33, 34, and the hydraulic servo SL2$b$ of the linear solenoid valve SL2 is connected to an input port (control pressure input port) 70$e$ of the dispensing valve (first switching valve) 70.

The dispensing valve 70 is a valve that dispenses the control pressure $P_{SL2}$ from the linear solenoid valve SL2 to the hydraulic servo 35 of the above described second brake B-2 or the hydraulic servo 32 of the second clutch C-2 that is engaged at the formation of another forward gear different from that for the second brake B-2, and has an input port (reverse range pressure input port) 70$c$ that communicates with the reverse range pressure output port 21$b$ of the manual valve 21, a drain port 70$h$, an output port (first output port) 70$b$, an output port (second output port) 70$d$, and an output port (third output port) 70$f$ connected to the hydraulic servo 32 of the second clutch C-2 in addition to the input port 70$e$.

Further, the dispensing valve 70 is adapted so that its spool position may be switched according to the signal pressure $P_{S1}$ from the solenoid valve S1 of normally-closed type, and, when the signal pressure $P_{S1}$ is output, the first state in which the input port 70$c$ to which the reverse range pressure $P_{REV}$ is input from the reverse range pressure output port 21$b$ and the output port 70$d$, the input port 70$e$ and the output port 70$f$, the drain port EX and the output port 70$b$ are connected is turned into the second state in which the input port 70$c$ and the output port 70$b$, the input port 70$e$ and the output port 70$d$ are communicated with each other.

The output port 70$b$ from which the reverse range pressure $P_{REV}$ may be output and the output port 70$d$ from which the reverse range pressure $P_{REV}$ or the control pressure $P_{SL2}$ is selectively output are connected to the input port (first input port) 71$e$ and the input port (second input port) 71$c$ of the B2 apply control valve 71, respectively.

The B2 apply control valve (second switching valve) 71 has an output port (fourth output port) 71$d$ connected to the hydraulic servo 35 of the second brake B-2 in addition to the input ports 71$e$, 71$c$, and, as is the case of the first embodiment, the spool position is switched in the case where the signal pressure $P_{S2}$ from the linear solenoid valve SL2 of normally-closed type is input to the oil chamber 71$a$ or the case where the reverse range pressure $P_{REV}$ from the output port 70$b$ is input as the signal pressure to the oil chamber 71$a$. When these signal pressures $P_{S2}$ and $P_{REV}$ are output, the B2 apply control valve 71 is switched from the third state in which the input port 71$e$ and the output port 71$d$ communicate with each other to the fourth state in which the input port 71$c$ and the output port 71$d$ communicate with each other.

Note that the oil chamber 71$a$ as a switching oil chamber to which the signal pressures $P_{S2}$ and $P_{REV}$ for switching the B2 apply control valve 71 are input may be provided as a separate oil chamber as in the first embodiment, or the same oil chamber may be used as in the embodiment.

Since the hydraulic control system 10 has the above described configuration, in the case where the third clutch C-3 to be engaged at reverse traveling is independently provided and the dispensing valve 70 dispenses the control pressure $P_{SL2}$ from the linear solenoid valve SL2 to the hydraulic servo 32 of the second clutch C-2 and the hydraulic servo 35 of the second brake B-2 not be engaged at reverse traveling, the reverse inhibit function may be achieved because the dispensing valve 70 turns into the first state and the second switching valve 71 turns into the fourth state.

Further, even in the case where it may be impossible to switch the first switching valve 70 from the reverse inhibit state (first state), by switching the second switching valve to the third state, the reverse range pressure $P_{REV}$ may be supplied as the engagement pressure to the hydraulic servo 35 of the second brake B-2 for engagement, and thereby, the reverse gear may be achieved in combination with the third clutch C-3.

Furthermore, even in the case where it may be impossible to switch the second switching valve 71 from the reverse inhibit state (fourth state), by switching the first switching valve 70 to the second state, the reverse range pressure $P_{REV}$ may be supplied as the engagement pressure to the hydraulic servo 35 of the second brake B-2 for engagement, and thereby, the reverse gear may be achieved in combination with the third clutch C-3.

Note that the aspects described in the above described first and second embodiments may naturally be combined in any way, and the engagement pressure to the third clutch C-3 may be supplied via the dispensing valve 70.

What is claimed is:

1. A hydraulic control system for an automatic transmission having a first friction engagement element to be engaged at establishment of a first forward gear and establishment of a reverse gear, and a second friction engagement element to be engaged at least at establishment of a second forward gear different from the first forward gear, the system comprising:

a range pressure output unit that outputs a reverse range pressure when a reverse range is selected;

a first switching valve having a reverse range pressure input port to which the reverse range pressure is input, a control pressure input port to which a control pressure from a linear solenoid valve is input, a first output port, a second output port, and a third output port connected to a hydraulic servo of the second friction engagement element, and switched to a first state in which the reverse range pressure input port and the second output port, the control pressure input port and the third output port are communicated with each other and a second state in which the reverse range pressure input port and the first output port, the control pressure input port and the second output port are communicated with each other;

a second switching valve having a first input port connected to the first output port, a second input port connected to the second output port, and a fourth output port connected to a hydraulic servo of the first friction engagement element, and switched to a third state in which the second input port and the fourth output port are communicated with each other and a fourth state in which the first input port and the fourth output port are communicated with each other;

a first on/off solenoid valve that may output a signal pressure for switching the first switching valve; and a second on/off solenoid valve that may output a signal pressure for switching the second switching valve.

2. The hydraulic control system for the automatic transmission according to claim 1, wherein the second on/off solenoid valve is a solenoid valve of normally-closed type, and the second switching valve is supplied with the reverse range pressure output from the first output port also as a signal pressure, and switched from the third state to the fourth state in the case where the signal pressure is output from the second on/off solenoid valve or the case where the reverse range pressure is output from the first output port.

3. The hydraulic control system of the automatic transmission according to claim 1, wherein the second friction engagement element is a friction engagement element that is engaged together with the first friction engagement element to achieve a reverse gear, and the first switching valve has a second reverse range pressure input port to which the reverse range pressure is input in addition to the reverse range pressure input port and communicates the second reverse range pressure input port with the third output port in the second state.

4. A control system for an automatic transmission that controls the hydraulic control system for the automatic transmission according to claim 1, comprising:

a range detection unit that detects that a reverse range has been selected;

a fail detection unit that detects that no reverse is established under a condition that the reverse range is detected by the range detection unit; and a fail time instruction unit that gives an instruction to the first on/off solenoid valve to switch the first switching valve to the second state when a detection that no reverse gear has been formed is made by the fail detection unit.

* * * * *